(12) United States Patent
Hofsteede et al.

(10) Patent No.: US 9,815,107 B1
(45) Date of Patent: Nov. 14, 2017

(54) TUBE HANDLING MACHINE AND METHOD

(71) Applicant: Armo Tool Ltd., London (CA)

(72) Inventors: Carl Hofsteede, Mt. Brydges (CA); Edward Hofsteede, Delaware (CA); Chris Lishman, Denfield (CA); James McLachlan, Dutton (CA); Ryan Peacock, Dutton (CA)

(73) Assignee: ARMO TOOL LTD., London, Ontario (CA)

( * ) Notice: Subject to any disclaimer, the term of this patent is extended or adjusted under 35 U.S.C. 154(b) by 0 days.

(21) Appl. No.: 15/292,168

(22) Filed: Oct. 13, 2016

(51) Int. Cl.
| | | |
|---|---|---|
| *B21D 43/00* | (2006.01) | |
| *B66F 11/00* | (2006.01) | |
| *B65G 47/00* | (2006.01) | |
| *B65G 47/88* | (2006.01) | |
| *B65G 11/02* | (2006.01) | |
| *B65G 47/44* | (2006.01) | |
| *B65G 47/46* | (2006.01) | |
| *B21D 43/16* | (2006.01) | |

(52) U.S. Cl.
CPC ........... *B21D 43/006* (2013.01); *B21D 43/16* (2013.01); *B65G 11/023* (2013.01); *B65G 47/44* (2013.01); *B65G 47/46* (2013.01); *B65G 47/8884* (2013.01); *B65G 2201/0276* (2013.01)

(58) Field of Classification Search
CPC .................................................. B21D 43/006
See application file for complete search history.

(56) References Cited

U.S. PATENT DOCUMENTS

| | | | | |
|---|---|---|---|---|
| 3,232,449 A | * | 2/1966 | Quin Shen ............ | B21B 39/002 414/746.1 |
| 3,598,279 A | * | 8/1971 | Duffau .................... | B65B 35/04 221/106 |
| 3,800,980 A | * | 4/1974 | Takeuchi ................. | B65G 1/08 221/195 |
| 4,388,039 A | * | 6/1983 | Schwarze ............ | B21D 43/006 198/543 |
| 4,982,891 A | * | 1/1991 | Kimura .................. | B21D 11/10 228/155 |
| 5,086,947 A | * | 2/1992 | Bragaglia ................ | B65G 1/12 221/194 |
| 5,188,503 A | * | 2/1993 | Appelberg ........... | B21D 43/006 211/49.1 |
| 5,350,128 A | * | 9/1994 | Deters .................. | B65G 47/248 198/465.1 |
| 5,901,596 A | * | 5/1999 | Tetzloff .................. | B21D 7/024 72/134 |

(Continued)

*Primary Examiner* — Thomas Randazzo
(74) *Attorney, Agent, or Firm* — Carlson, Gaskey & Olds, P.C.

(57) ABSTRACT

An illustrative example tube handling machine includes a lifter configured to receive a plurality of tubes when at least a portion of the lifter is at a first position. The lifter is configured to lift the plurality of tubes to a second, higher vertical position. A plurality of cells are respectively configured for at least temporarily holding the plurality of tubes. A first one of the cells is situated to receive the plurality of tubes from the lifter at the second vertical position. The cells are situated relative to each other such that the plurality of tubes can be sequentially transferred among the cells from the first one of the cells to a last one of the cells that releases the plurality of tubes to a delivery location.

20 Claims, 9 Drawing Sheets

(56) References Cited

U.S. PATENT DOCUMENTS

| | | | | |
|---|---|---|---|---|
| 6,485,251 B1* | 11/2002 | Fisher | ............... | B65G 15/10 |
| | | | | 198/728 |
| 7,104,100 B2* | 9/2006 | Saegusa | ............ | B21D 7/024 |
| | | | | 72/149 |
| 7,134,310 B2* | 11/2006 | Hu | ........... | B21D 7/024 |
| | | | | 72/217 |
| 7,891,225 B2* | 2/2011 | Hammerer | ......... | B21D 7/12 |
| | | | | 72/299 |
| 2011/0302977 A1* | 12/2011 | Broggi | ............ | B21D 43/006 |
| | | | | 72/20.2 |

\* cited by examiner

TUBE HANDLING MACHINE AND METHOD

BACKGROUND

Tubes are used for a variety of purposes including fluid handling systems for automobiles. Typical tube arrangements include a set of tubes bent into a desired shape or configuration. Various tube bending machines are known.

One challenge associated with tube bending processes or machines is that an operator needs to be available to load a set number of tubes into the machine on a frequent basis. The nature of long tubes limits the number of tubes that can be gathered into one place without at least some of the tubes becoming tangled or damaged. Relatively smaller numbers of tubes are typically loaded at one time and a few minutes later another set of tubes is needed. The operator therefore must effectively be near the tube bending machine input in a standby mode and this limits the productivity of such an individual.

Another challenge associated with known tube handling arrangements is that they tend to take up a significant amount of floor space. When space is at a premium or the business expense per square foot is significant, the required amount of space is a notable disadvantage.

Embodiments of this invention address the needs mentioned above by reducing the time an operator must dedicate to loading a tube handling machine and by reducing the amount of space required by such a machine.

SUMMARY

An illustrative example tube handling machine includes a lifter configured to receive a plurality of tubes when at least a portion of the lifter is at a first position. The lifter is configured to lift the plurality of tubes to a second, higher vertical position. A plurality of cells are respectively configured for at least temporarily holding the plurality of tubes. A first one of the cells is situated to receive the plurality of tubes from the lifter at the second vertical position. The cells are situated relative to each other such that the plurality of tubes can be sequentially transferred among the cells from the first one of the cells to a last one of the cells that releases the plurality of tubes to a delivery location.

An illustrative example method of handling tubes includes providing a plurality of tubes to a lifter at a first vertical position; using the lifter to raise the plurality of tubes to a second, higher vertical position; placing the plurality of tubes in a first one of a plurality of cells when the tubes are at the second vertical position; releasing the plurality of tubes from the first one of the plurality of cells into another one of the plurality of cells; sequentially releasing the plurality of tubes through the plurality of cells until the tubes are in a last one of the plurality of cells; and releasing the plurality of tubes from the last one of the cells to a delivery location when a predefined condition exists at the delivery location.

Various features and advantages of at least one example embodiment of this invention will become apparent to those skilled in the art from the following detailed description. The drawings that accompany the detailed description can be briefly described as follows.

DETAILED DESCRIPTION

Figure 1:
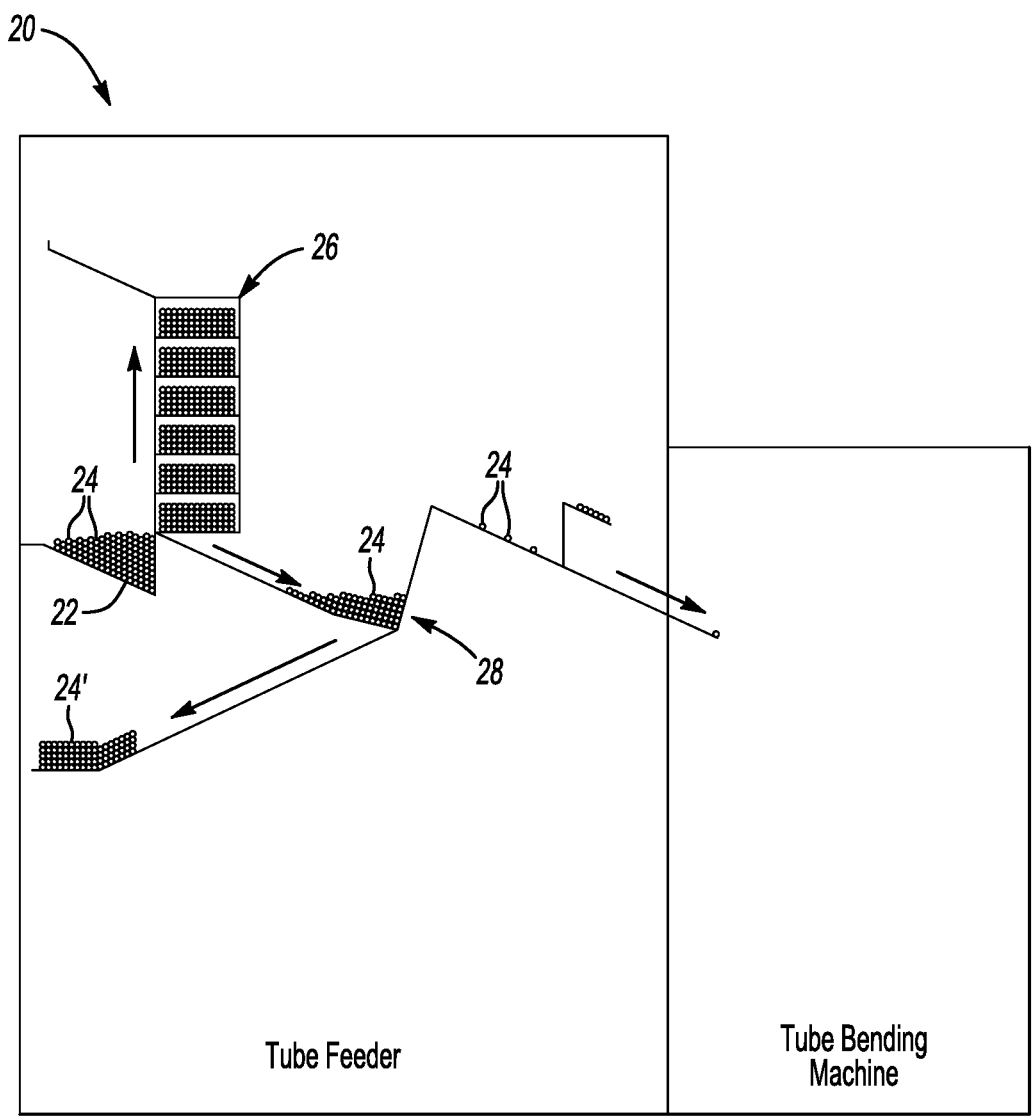
FIG. 1 diagrammatically illustrates an example embodiment of a machine designed according to an embodiment of this invention.

FIG. 1 schematically illustrates an example tube handling machine 20 that includes a lifter 22 that is configured to lift a plurality of tubes 24 from a first vertical position or height to a second, higher vertical position or height. In FIG. 1, the lifter 22 is shown at the first vertical position where the lifter 22 can be reached or accessed by an individual who places a plurality of the tubes 22 on the lifter. In some examples, the first vertical position is about one meter above a floor surface.

A plurality of cells 26 are configured to at least temporarily hold tubes 24. The cells 26 receive the tubes from the lifter and selectively provide the tubes 24 to a delivery location 28. In this example, the delivery location 28 is associated with an input to a tube bending machine. The tube handling machine facilitates providing tubes to the bending machine for a selected bending process, such as one for making automobile fluid-handling tube assemblies. The tube bending machine works in a known manner.

In the example if FIG. 1, there is a known tube checking device or assembly that determines whether any of the tubes 24 at the delivery location 28 has a defect that would make it undesirable or unusable for the intended result provided by the tube bending machine. Such tubes are shown at 24'.

Figure 2:
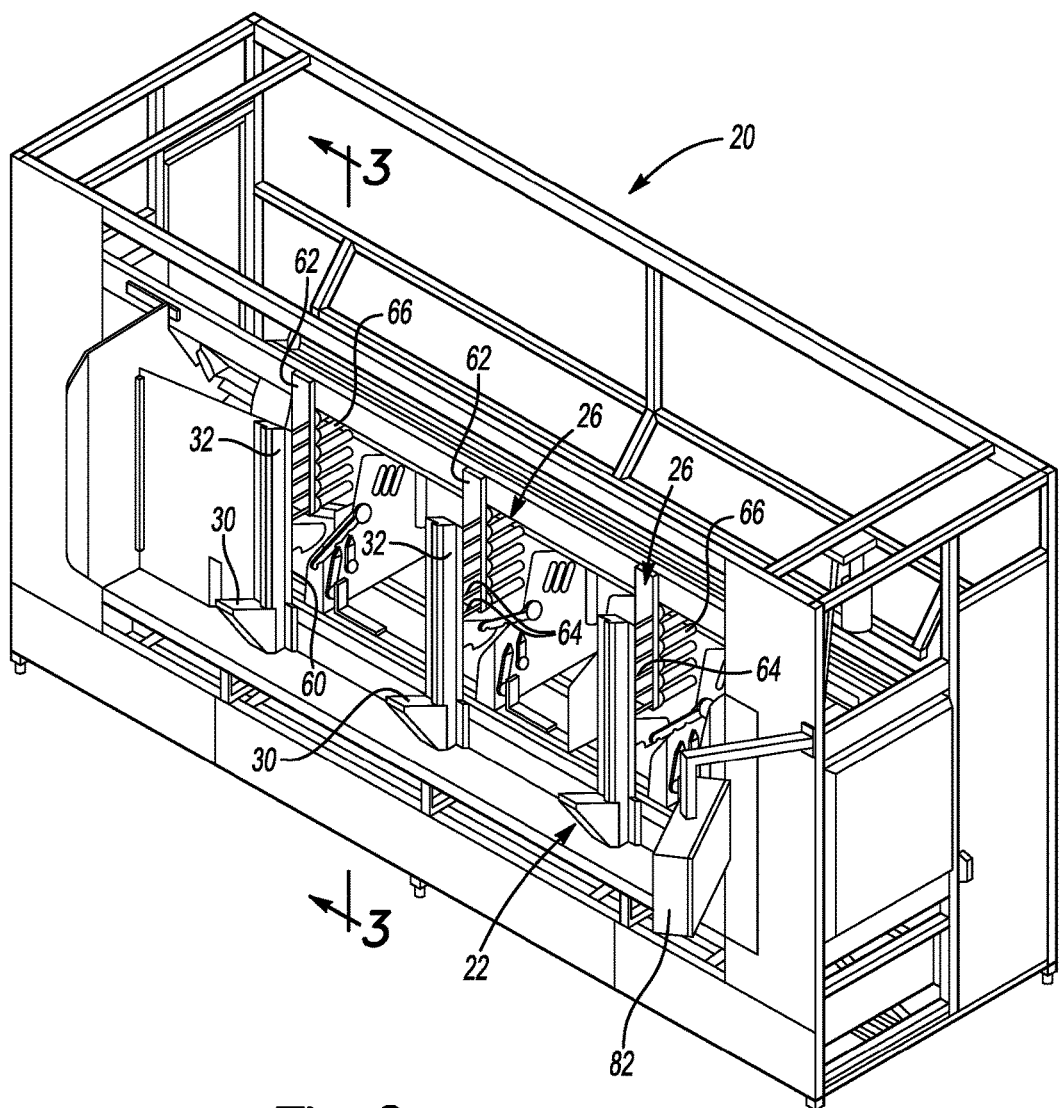
FIG. 2 is a perspective illustration of an example tube handling machine.
Figure 3:
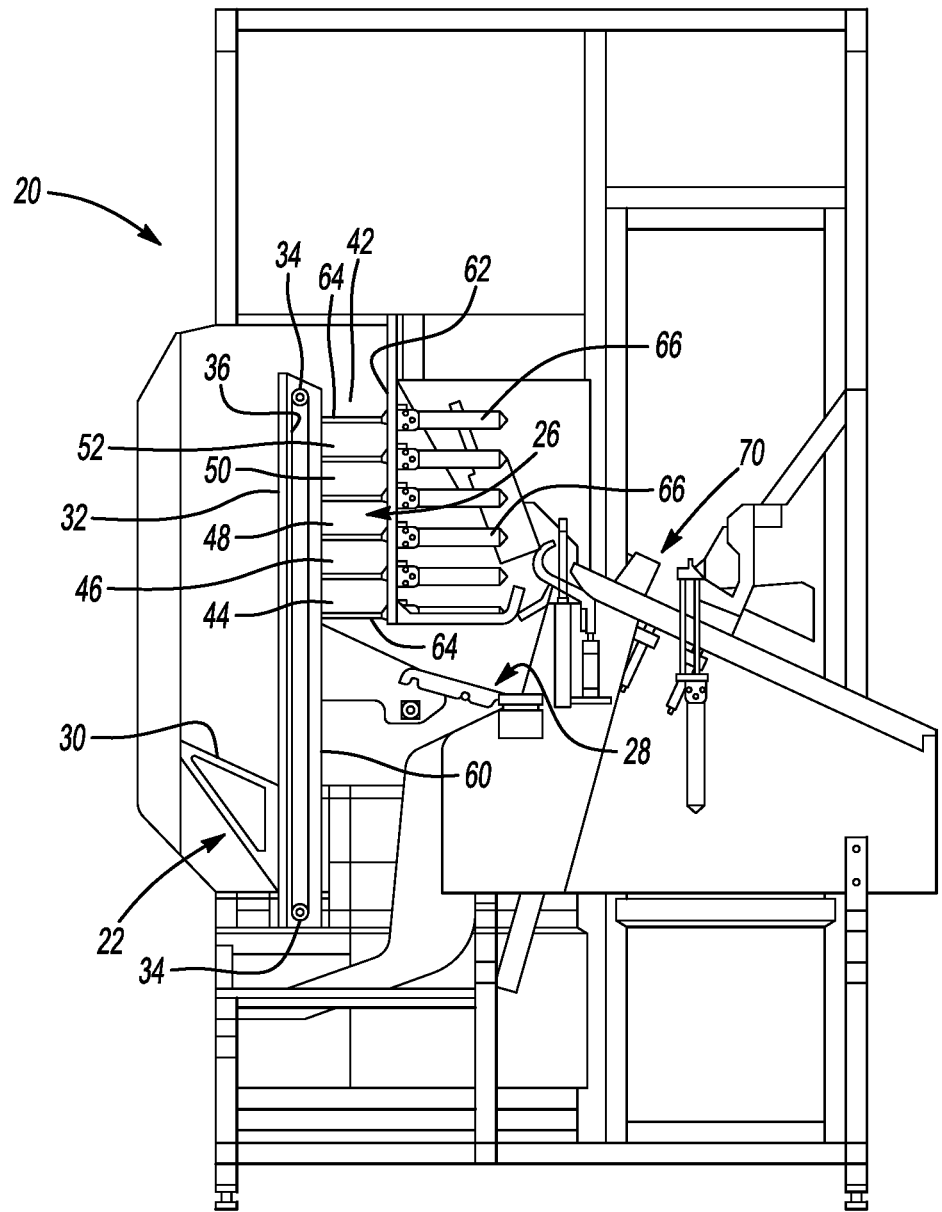
FIG. 3 is a cross-sectional view taken along the lines 3-3 in FIG. 2.

An example embodiment of a tube handling machine 20 is shown in FIGS. 2 and 3. In this example, the lifter 22 includes a plurality of angled supports 30 that are spaced from each other along a length of tubes that will be handled by the machine 20. The angled supports 30 have upwardly facing surfaces on which tubes are placed on an as needed or desired basis. The lifter 22 includes vertical tracks 32 along which the angled supports 30 move between the first and second vertical positions. The angled supports 30 are shown in the first vertical position in FIGS. 2 and 3. A motorized actuator selectively causes movement of the angled supports 30 along the tracks 32. The motorized actuator in this example includes sheaves or sprockets 34 that establish a path or loop around which a drive member 36, such as a belt, cable or chain moves to cause vertical movement of the angled supports 30.

In this example, the plurality of cells 26 includes a first cell 42 and a last cell 44. This example has four other cells between the first cell and the last cell shown at 46, 48, 50, and 52. The total number of cells may be different in other embodiments. The plurality of cells 26 are situated relative to each other to facilitate transfer of a selected amount of tubes among the cells from the first cell 42 to the last cell 44.

In the illustrated example, the cells 26 are arranged in a vertical progression so that each of the cells can selectively release tubes 24 from that cell to a next, vertically adjacent one of the cells. The vertical progression includes one cell at a higher vertical position than a next one of the cells so that gravity causes tubes to move into the next one of the cells when the tubes are released by the cell that was holding them. In this example, the vertical progression includes the cells vertically aligned with each cell other than the last cell 44 directly above an adjacent one of the cells. Vertical supports 60 associated with the vertical tracks 32 establish or define one vertical boundary of the cells. Vertical supports 62 are parallel with and spaced from the vertical supports 60. The vertical supports 62 establish or define a second vertical boundary of the cells. Horizontal members 64 establish or define at least one horizontal boundary of the cells. In this example, the horizontal members 64 establish or define a bottom boundary for each cell and may be referred to as bottom containment members. Tubes 24 received into one of the cells 26 rest upon or are supported by the horizontal members 24 near the bottom of each cell.

In this example, the horizontal members 64 comprise rods that are generally perpendicular to the vertical or upright supports 60 and 62. Some embodiments include at least one plate or platform as the horizontal support instead of or in addition to rods. Each of the horizontal members is associated with an actuator 66 that is supported by the corresponding upright 62. The actuators 66 selectively cause movement of selected ones of the horizontal members between a holding position for retaining or holding tubes 24 in a corresponding cell and a releasing position for releasing tubes from the corresponding cell.

In this example, the rods 64 are moveable along their respective axes by the actuators 66. One end of each rod moves from a position near the upright 60, which corresponds to the holding position, to a position spaced away from the upright 60 (and closer to the upright 62). In other words, the actuators 66 selectively cause the rods of the horizontal support members to translate or slide between the holding and releasing positions. The embodiment of FIGS. 2 and 3 include openings in the uprights 62 through which the horizontal members or rods 64 are received during movement between the holding and releasing positions.

In other embodiments, the actuators 66 cause pivotal movement of a horizontal support member that may be hinged along one edge, for example. Given this description, those skilled in the art may realize other types of motion of a portion of a cell or even an entire cell to achieve a desired transfer of tubes from one cell to another.

The cells 26 are situated for delivering or providing tubes 24 to the delivery location 28 from which a tube feeding mechanism 70 obtains the tubes in a known manner so that tubes can be processed by a tube bending machine or another machine.

FIGS. 4A-4L schematically illustrate an example process of handling tubes 24 using the cells 26. A plurality of sensors or detectors 80 are associated with the cells 26 in this example. The sensors or detectors 80 provide an indication whether the cells contain tubes. In some embodiments a sensor 80 is provided for each cell while in other embodiments a single sensor device may be configured to detect the presence of tubes in multiple (or all of) the cells. The sensors 80 in some embodiments are known devices that detect the presence of tubes by weight or optical detection, for example.

A controller 82 (FIG. 2) obtains information from the sensors 80 and uses that information to control whether the respective cells require tubes or should release tubes to another cell or the delivery location 28. For example, when the delivery location requires more tubes the controller 82 causes the last cell 44 to release any tubes in that cell to the delivery location 28. Depending on the needs of a particular situation a variety of conditions can be predefined that indicate a need for more tubes at the delivery location 28.

Figure 4A:
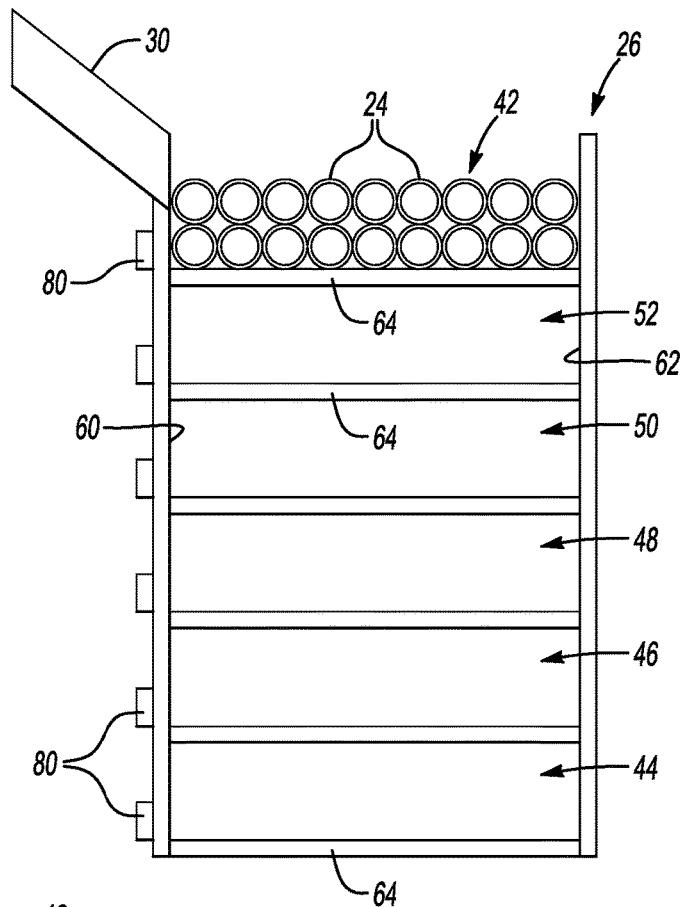
FIGS. 4A-4L schematically illustrate selected portions of a process of handling tubes using a plurality of cells designed according to an embodiment of this invention.

FIG. 4A shows a plurality of tubes 24 in the first cell 42, which results from the angled support 30 of the lifter 22 raising those tubes 24 to the second vertical position where the tubes 24 effectively fall into the first cell 42. After providing the tubes 24 to the first cell 42, the angled support 30 returns to the first vertical position where it is possible for an individual (or another mechanism) to place additional tubes onto the angled support 30. The controller 82 controls the operation of the lifter 22.

The plurality of tubes 24 corresponds to a selected amount of tubes. The selected amount may be determined by a number of tubes, a weight of the tubes or a volume occupied by the tubes, depending on the particular situation. The selected amount of tubes is chosen to avoid undesirable tangling or damage to the tubes and allows for efficient and effective tube handling.

As shown in FIG. 4A, the last cell 44 does not contain any tubes 24, which is indicated by a corresponding one of the detectors 80. It is necessary to load the last cell 44 so that tubes can be provided to the delivery location at the next instance where additional tubes are required. FIGS. 4A through 4G illustrate an example way of loading the plurality of tubes 24 in the last cell 44, which includes sequentially transferring the tubes from one cell to the next along the vertical progression.

Any reference to a rod or horizontal member in the following discussion should be understood to pertain to multiple rods or other horizontal members when appropriate. For example, each cell 26 in the embodiment of FIGS. 2 and 3 has three rods at the bottom of the corresponding cell. Any control over or movement of those three rods would be coordinated so that all three are in the holding or releasing position simultaneously. The following discussion will only mention one such rod for simplicity and to explain how other embodiments may work that have only a single horizontal member along the bottom of a cell.

Figure 4B:
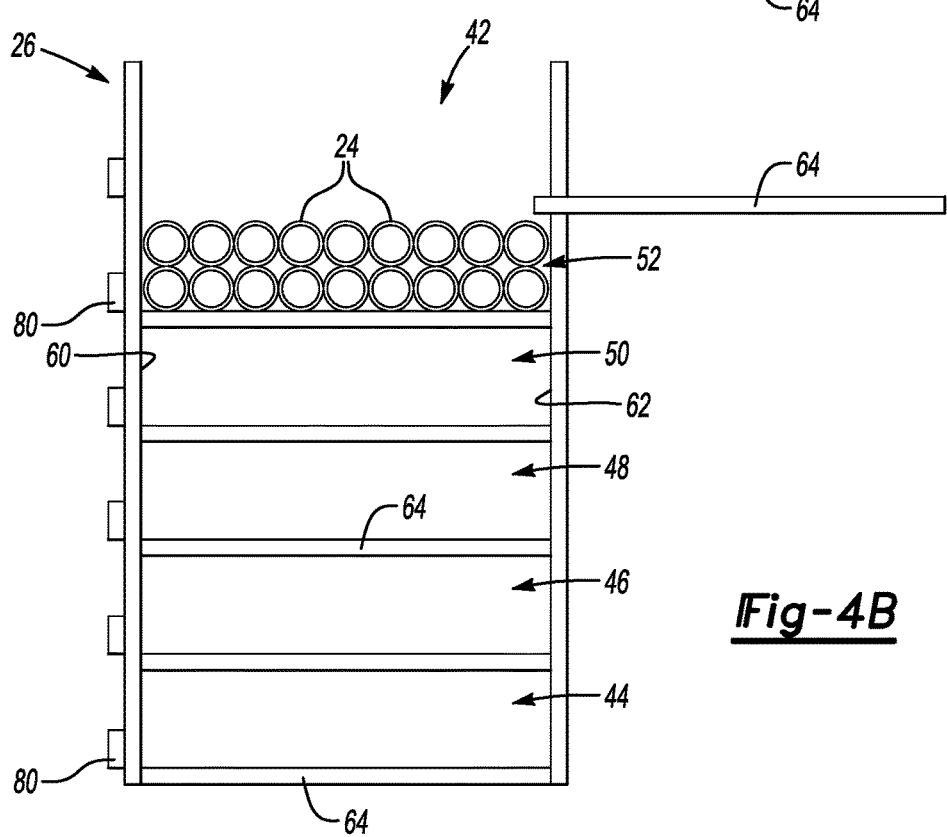
Figure 4C:
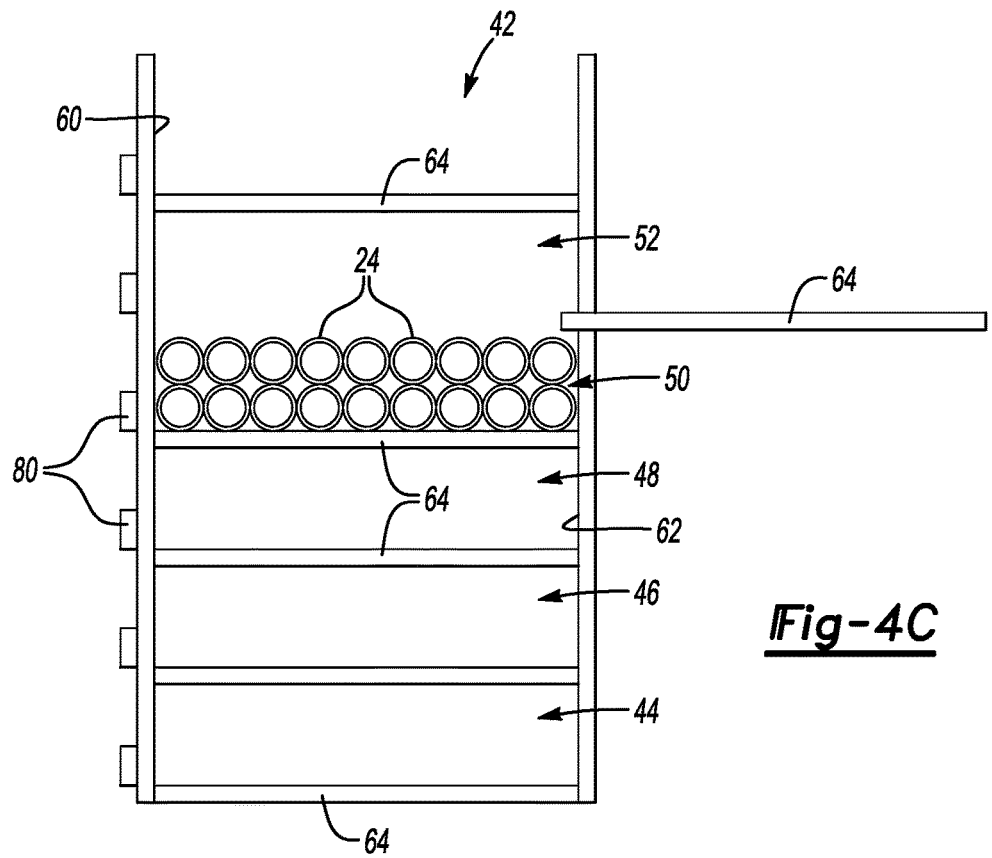

FIG. 4B shows the rod 64 at the bottom of the first cell 42 in the releasing position. In this condition the tubes 24 are free to fall into the cell 52 where they are temporarily held. The controller 82 causes the actuator 66 (FIGS. 2 and 3) associated with that rod 64 to move the rod from the holding position shown in FIG. 4A to the releasing position shown in FIG. 4B. FIG. 4C shows the rod 64 at the bottom of the first cell 42 returned to the holding position and the rod 64 at the bottom of the cell 52 after it moved into the releasing position. The plurality of tubes 24 have moved or fallen into the cell 50 in FIG. 4C.

Figure 4D:
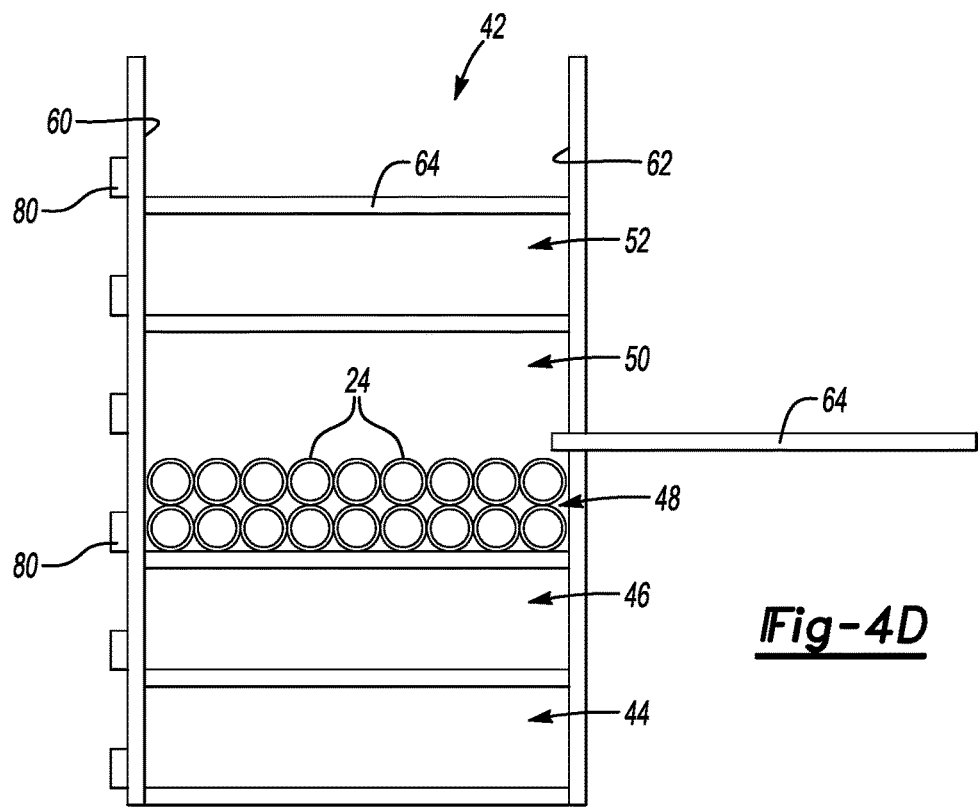
Figure 4E:
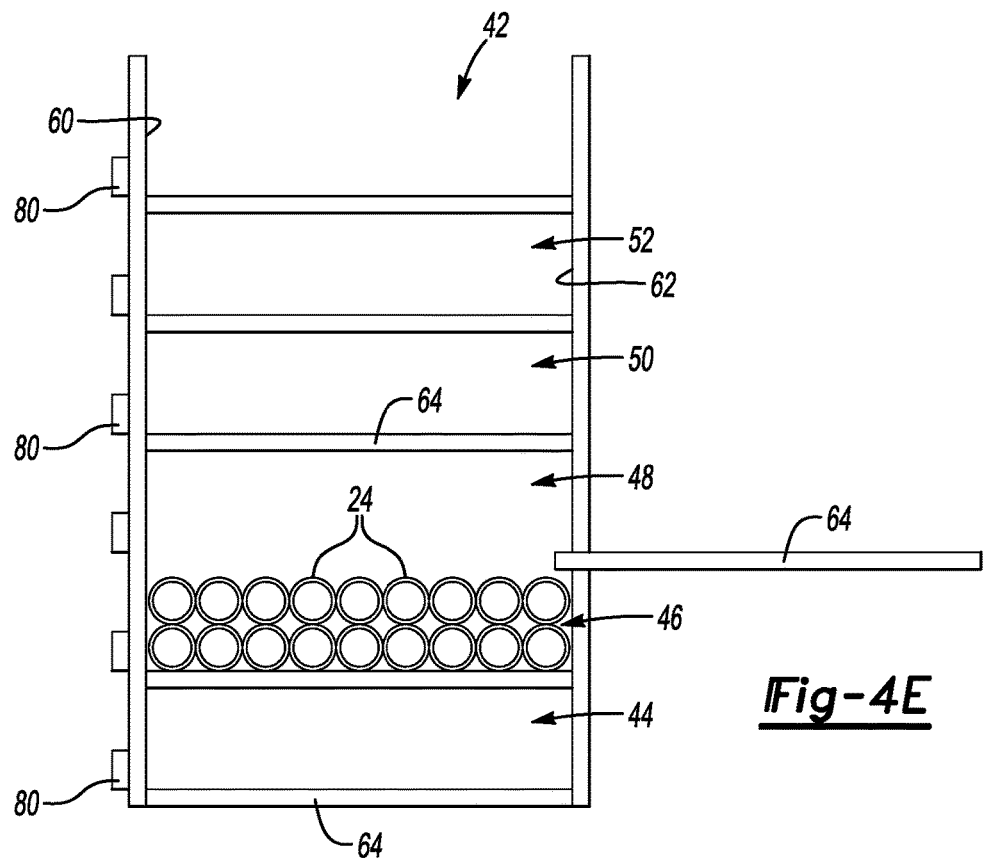
Figure 4F:
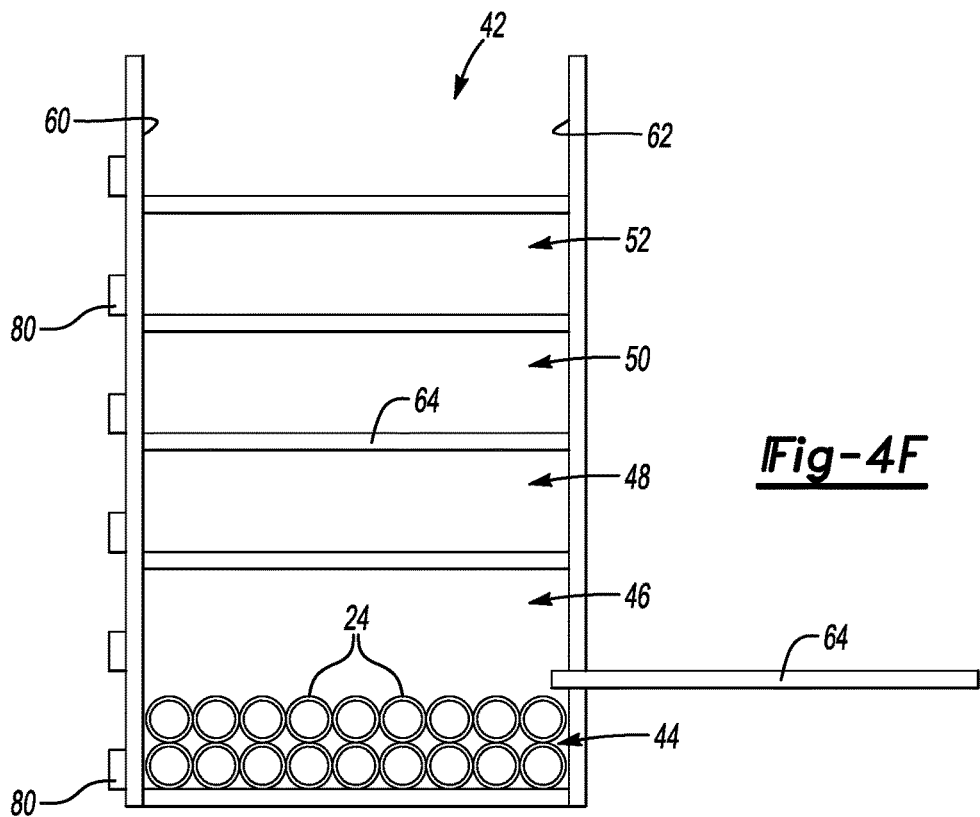

FIG. 4D shows the tubes in the cell 48 after the rod 64 at the bottom of the cell 50 moved into the releasing position. The controller 82 next causes the appropriate actuator 66 to move that rod back into the holding position and the rod 64 at the bottom of the cell 48 to move into the releasing position as shown in FIG. 4E. In that condition, the tubes 24 have fallen into the cell 46. Next, as shown in FIG. 4F, the rod 64 at the bottom of the cell 46 moves from the holding position into the releasing position and the plurality of tubes 24 move into the last cell 44.

Figure 4G:
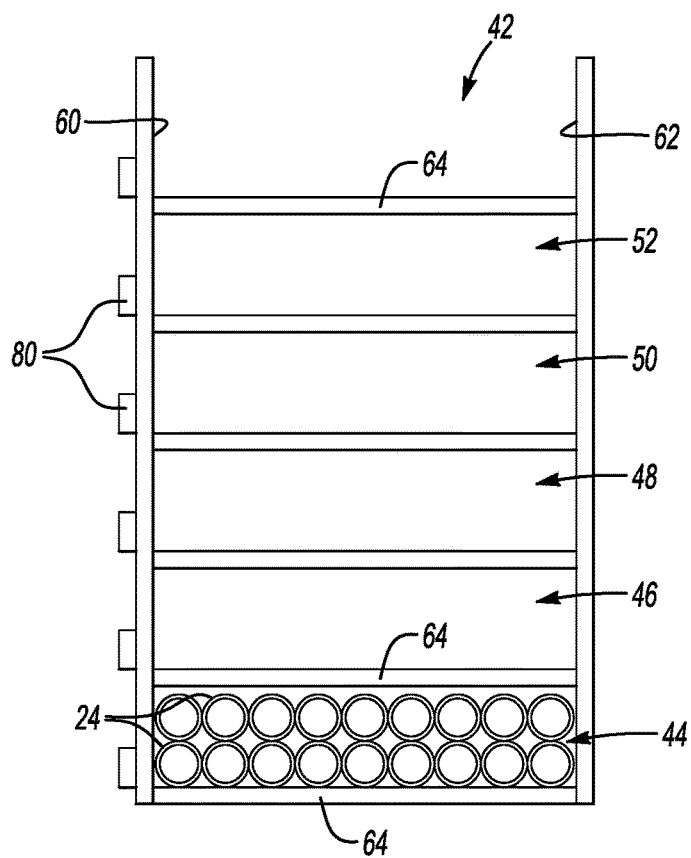

In FIG. 4G, all rods 64 are in the holding position and the last cell 44 holds or retains the tubes 24 until they are needed at the delivery location. The controller 82 determines when additional tubes should be supplied to the delivery location 28 and causes the rod 64 at the bottom of the last cell 44 to move into the releasing position to release the tubes to the delivery location 28.

One of the features of the example embodiment is that it allows an operator to load the tube handling machine 20 with a sufficient amount of tubes to allow the operator to attend to other tasks. For example, the tube handling machine may run unattended for up to an hour before more tubes have to be loaded into the cells to ensure that an adequate amount of tubes are available at the delivery location 28. One way in which that feature is realized is by using the plurality of cells 26 and sequentially releasing a controlled or selected amount of tubes from one cell to another and eventually to the delivery location 28.

Figure 4H:
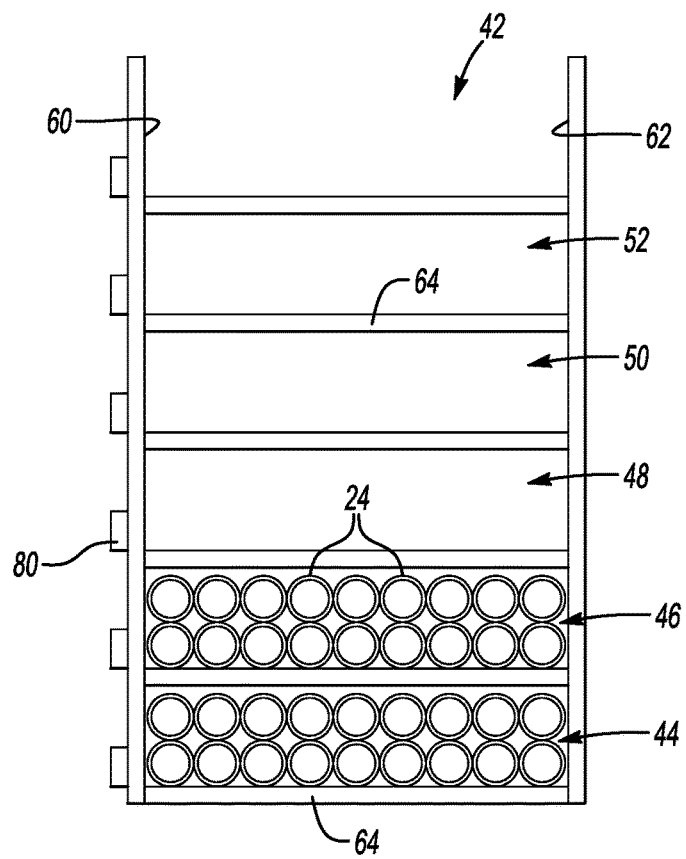
Figure 4I:
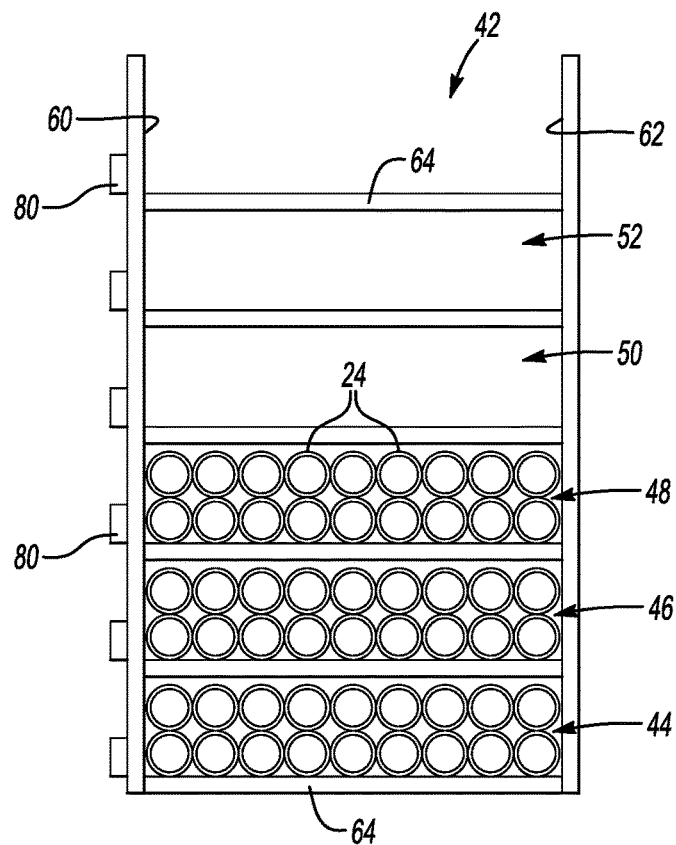
Figure 4J:
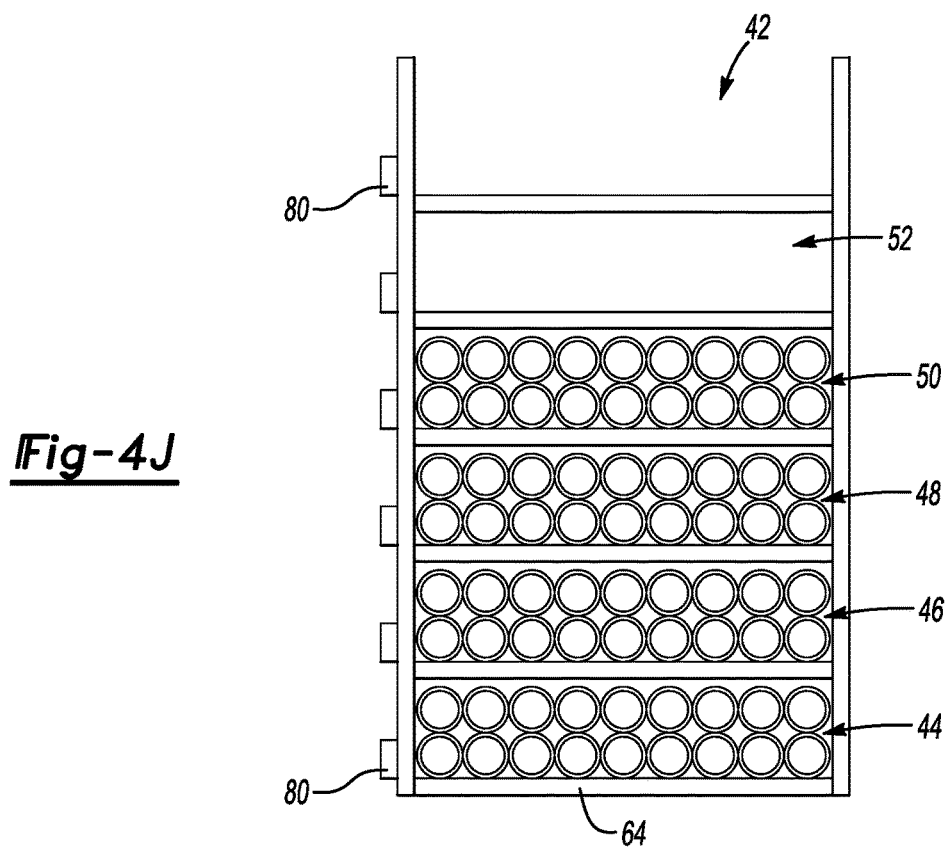
Figure 4K:
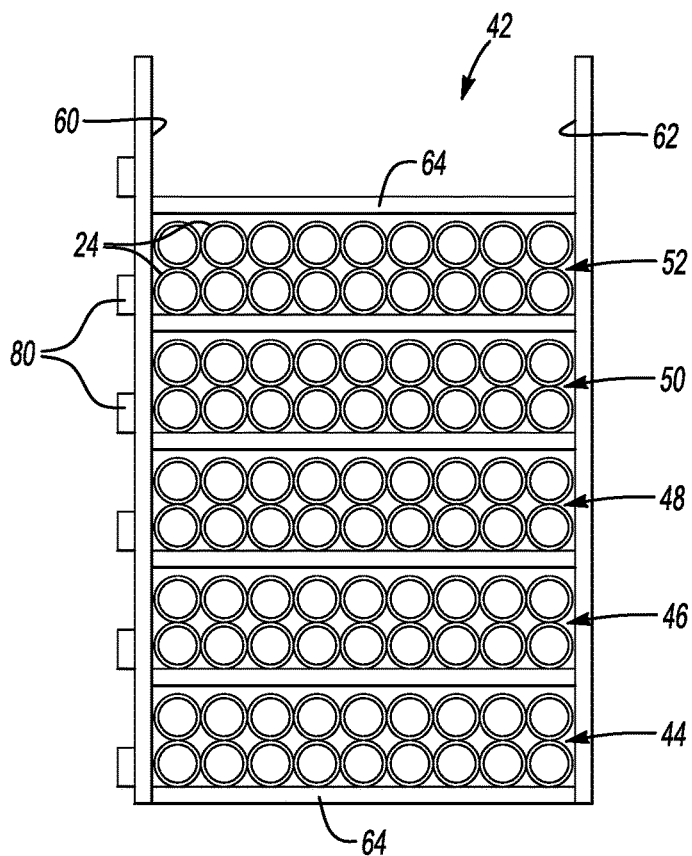
Figure 4L:
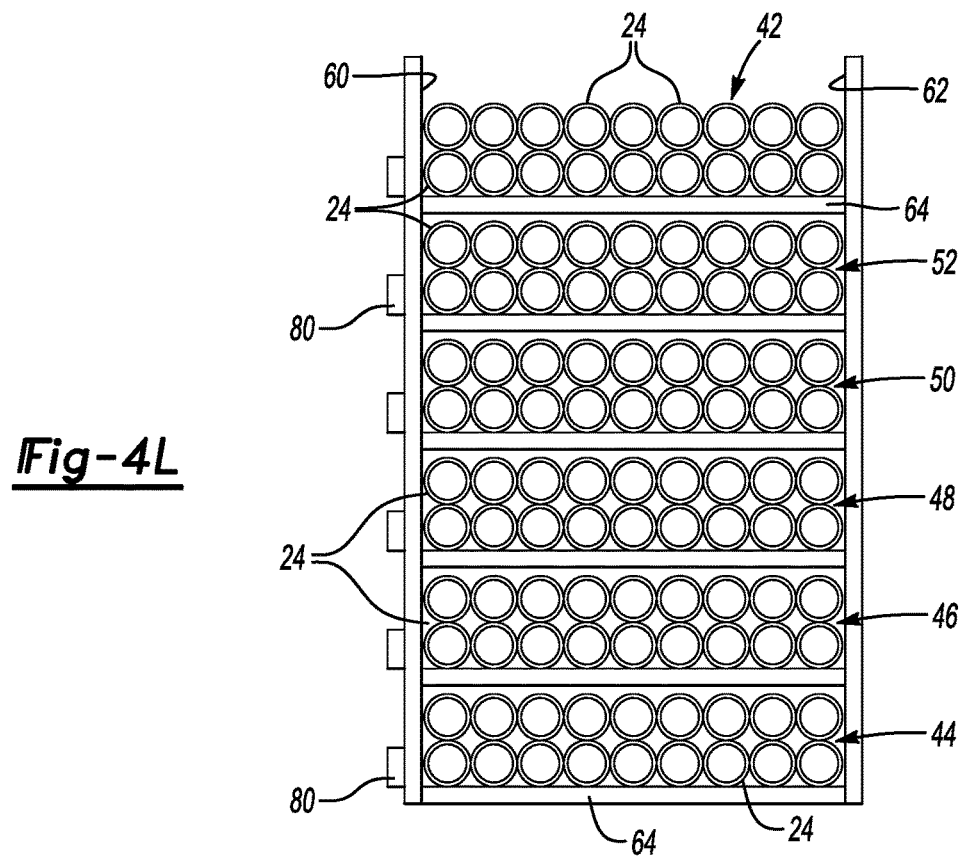

With the last cell 44 holding tubes 24 as shown in FIG. 4G, the controller 82 controls the actuators 66 and rods 64 to perform the steps shown in FIGS. 4A through 4E to load a second plurality of tubes 24 into the cell 46 as shown in FIG. 4H. Next, repeating the steps shown in FIGS. 4A through 4D loads the cell 48 with tubes as shown in FIG. 4I. After that the steps shown in FIGS. 4A through 4C are used to load the selected amount of tubes into the cell 50 as shown in FIG. 4J. The steps of FIGS. 4A and 4B load the cell 52 as shown in FIG. 4K and performing step 4A once more places the selected amount of tubes in the first cell 42 yielding the result shown in FIG. 4L.

Given this description, those skilled in the art will realize that the particular sequence described above may be varied to meet different needs. For example, it may be possible to load additional tubes into the first cell 42 in the condition shown in FIG. 4C and have two sets of tubes progress downward through the cells in a cell-by-cell manner when faster loading of all cells is needed. While the process described above and shown in the figures includes having adjacent cells filled without an empty cell between them, it may be possible in some situations to at least temporarily keep one or more empty cells between other cells that contain tubes.

The controller 82 in this example embodiment controls the cells to release tubes into a next one of the cells along the vertical progression when the next one of the cells does not contain the selected amount of tubes. For example, during the procedure shown in FIGS. 4A through 4E, the sensors 80 always indicate the absence of tubes from a cell beneath a cell that currently contains tubes. Once the last cell contains the tubes 24 as shown in FIG. 4G, which will be indicated by the corresponding sensor 80, the cell 46 will be controlled to retain any tubes placed into the cell 46 until a time when the last cell 44 releases tubes to the delivery location 28 and the last cell is once again ready to receive more tubes. Similarly, in the condition shown in FIG. 4J the sensors 80 detect tubes in the cells 44-50. In that condition, only the cell 42 will release tubes into the next cell 52 and all other rods or bottom containment members remain in the holding position at least until more tubes are needed at the delivery location and released from the last cell 44.

When the controller 82 determines that more tubes are needed at the delivery location 28, the controller 82 causes the bottom containment member 64 of the last cell 44 to move into the releasing position to release those tubes. The sensor 80 then indicates that the last cell 44 is empty. The controller 82 confirms that the rod 64 at the bottom of the last cell 44 returns to the holding position and then controls the cell 46 to release tubes from it into the last cell 44. The controller 82 can then sequentially cause tubes to progress on a cell-by-cell basis through the vertical progression so that the lowest cells contain tubes. The number of cells holding tubes will depend on how many times the last cell empties to deliver tubes to the delivery location 28 since tubes were last introduced into the cells. In some examples, when the sensors 80 indicate that a threshold number of cells are empty, the controller 82 generates a signal to add more tubes to the lifter 22 for refilling at least some of the cells 26. In some examples, at least one of a visible or audible indicator is activated to alert an operator of the need to put more tubes into the machine 20.

Utilizing a plurality of cells 26 with a selected amount of tubes within them, respectively, allows for preloading the tube handling machine 20 with a sufficient number of tubes to feed the delivery location 28 for a longer time than was possible without a machine designed according to an embodiment of this invention. For example, an operator may leave the machine 20 unattended for up to an hour compared to having to reload the delivery location every five or ten minutes. Additionally, the example arrangement of cells requires significantly less floor space than otherwise would be required for loading the same number of tubes onto a machine. The lifter 22 allows an operator to place the tubes onto the machine 20 at a comfortable or ergonomic height while still having the cells 28 arranged in a space-saving vertical progression, such as the stack in the illustrated example.

The preceding description is illustrative rather than limiting in nature. Variations and modifications to the disclosed examples may become apparent to those skilled in the art that do not necessarily depart from the essence of the contribution to the art provided by the disclosed embodiments. The scope of legal protection can only be determined by studying the following claims.

We claim:

1. A tube handling machine, comprising:
   a lifter configured to receive a plurality of tubes when at least a portion of the lifter is at a first position and to lift the plurality of tubes to a second, higher vertical position; and
   a plurality of cells respectively configured for at least temporarily holding the plurality of tubes, a first one of the cells being situated to receive the plurality of tubes from the lifter at the second vertical position, wherein the cells are situated relative to each other such that the plurality of tubes can be sequentially transferred among the cells from the first one of the cells to a last one of the cells that releases the plurality of tubes to a delivery location.

2. The tube handling machine of claim 1, wherein
   the plurality of cells are arranged in a vertical progression;
   the first one of cells is near a top of the vertical progression;
   the last one of the cells is near a bottom of the vertical progression; and
   each cell, other than the last one of the cells, respectively releases the plurality of tubes to a next one of the cells adjacent to and vertically lower than each cell.

3. The tube handling machine of claim 2, wherein
   the plurality of cells includes at least one cell between the first one of the cells and the last one of the cells,
   the at least one of the cells is directly beneath and aligned with the first one of the cells;
   the at least one of the cells is directly above and aligned with the last one of the cells; and
   the plurality of cells respectively include at least one bottom containment member that is selectively moveable between a holding position for holding the plurality of tubes in the cell and a releasing position for releasing the plurality of tubes to a next one of the cells directly adjacent and beneath the cell.

4. The tube handling machine of claim 3, wherein the at least one bottom containment member comprises a plurality of rods that are selectively moveable between the holding position and the releasing position.

5. The tube handling machine of claim 3, wherein there are at least four cells between the first one of the cells and the last one of the cells.

6. The tube handling machine of claim 1, comprising
a plurality of upright supports; and
a plurality of generally horizontal members;
wherein
the upright supports define vertical boundaries of the plurality of cells;
the generally horizontal members define at least one horizontal boundary of the plurality of cells; and
the generally horizontal members are respectively and selectively moveable relative to the upright supports for selectively opening or closing the cells, respectively.

7. The tube handling machine of claim 6, wherein
the generally horizontal members comprise rods;
each rod has an axis;
each rod is moveable along the respective axis between a holding position for holding tubes in the respective cell and a releasing position for releasing tubes from the respective cell.

8. The tube handling machine of claim 7, wherein
the rods are each received at least partially through a first one of the upright supports;
an end of each rod is moveable away toward a second one of the upright supports into the holding position; and
the end of each rod is moveable in an opposite direction away from the second one of the upright supports into the releasing position.

9. The tube handling machine of claim 6, wherein tubes in one of the cells are received upon and supported by one of the generally horizontal members along a bottom of the one of the cells.

10. The tube handling machine of claim 1, comprising
a controller that determines whether tubes are needed at the delivery location and selectively controls at least the last one of the cells to release the plurality of tubes to the delivery location.

11. The tube handling machine of claim 10, wherein
the controller opens the last one of the cells to release tubes from the last one of the cells to the delivery location;
the controller subsequently closes the last one of the cells;
the controller subsequently opens a next one of the cells adjacent the last one of the cells to release tubes from the next one of the cells into the last one of the cells; and
the controller subsequently closes the next one of the cells.

12. The tube handling machine of claim 10, wherein
the controller determines when at least one of the cells does not contain any tubes;
the controller determines that there are available tubes on the lifter;
the controller causes the lifter to bring the available tubes to the second vertical position where the available tubes are delivered to the first one of the cells.

13. The tube handling machine of claim 10, wherein
the controller selectively controls the lifter and the cells, respectively, to provide a selected amount of tubes in each of the cells by first providing the selected amount of tubes in the last one of the cells and then providing the selected amount of tubes in the others of the cells sequentially in an order from one of the cells closest to the last one of the cells to the first one of the cells.

14. The tube handling machine of claim 10, wherein the controller generates a signal to provide an indication to a user to add tubes to the filler when additional tubes are needed in at least one of the cells or at the delivery location.

15. The tube handling machine of claim 1, wherein the delivery location corresponds to an input to a tube bending machine.

16. A method of handling tubes, the method comprising:
providing a plurality of tubes to a lifter at a first vertical position;
using the lifter to raise the plurality of tubes to a second, higher vertical position;
placing the plurality of tubes in a first one of a plurality of cells when the tubes are at the second vertical position;
releasing the plurality of tubes from the first one of the plurality of cells into another one of the plurality of cells;
sequentially releasing the plurality of tubes through the plurality of cells until the tubes are in a last one of the plurality of cells; and
releasing the plurality of tubes from the last one of the cells to a delivery location when a predefined condition exists at the delivery location.

17. The method of claim 16, comprising selectively controlling the lifter and the cells, respectively, to provide a selected amount of tubes in each of the cells by first providing the selected amount of tubes in the last one of the cells and then providing the selected amount of tubes in the others of the cells sequentially in an order from one of the cells closest to the last one of the cells to the first one of the cells.

18. The method of claim 17, comprising
selectively controlling the lifter and the cells, respectively, to provide the selected amount of tubes in each of the cells by
releasing tubes from one of the cells adjacent a next one of the cells that does not have the selected amount of tubes into the next one of the cells until the selected amount of tubes are in the last one of the cells; and
then releasing tubes from one of the cells adjacent a next one of the cells that does not have the selected amount of tubes into the next one of the cells until the others of the cells are respectively provided with the selected amount of tubes sequentially in an order from one of the cells closest to the last one of the cells to the first one of the cells.

19. The method of claim 16, wherein
the plurality of cells are arranged in a vertical progression;
the first one of cells is near a top of the vertical progression;
the last one of the cells is near a bottom of the vertical progression; and
the method includes controlling each cell, other than the last one of the cells, respectively for releasing the plurality of tubes to a next one of the cells adjacent to and vertically lower than each cell.

20. The method of claim 19, wherein
the plurality of cells includes at least one cell between the first one of the cells and the last one of the cells,
the at least one of the cells is directly beneath and aligned with the first one of the cells;
the at least one of the cells is directly above and aligned with the last one of the cells;
the plurality of cells respectively include at least one bottom containment member; and
the method includes selectively moving the respective at least one bottom containment members between a holding position for holding the plurality of tubes in the cell and a releasing position for releasing the plurality of tubes to a next one of the cells directly adjacent and beneath the cell.

\* \* \* \* \*